United States Patent Office 3,231,560
Patented Jan. 25, 1966

3,231,560
DIALDEHYDE POLYSACCHARIDE BISULFITE ADDUCTS
James L. Keen, New Brighton, and Harry G. Simmerman, St. Paul, Minn., assignors to General Mills, Inc., a corporation of Delaware
No Drawing. Filed Jan. 25, 1963, Ser. No. 254,004
10 Claims. (Cl. 260—209)

This invention relates to aldehyde carbohydrate bisulfite adducts, novel methods of preparing same and novel methods of utilizing same. In particular, the invention relates to the adducts of polymeric aldehyde carbohydrates such as dialdehyde cellulose, dialdehyde starch and dialdehyde polygalactomannan gums such as guar or locust bean gum.

In the dry form, such polymeric aldehyde carbohydrates are for all practical purposes water insoluble. Once dissolved in dilute solution or when manufactured in dilute solution, they remain in water solution. As the dilute solution is concentrated, the aldehydes participate in cross-linking and water insoluble products result. In order to put them in water solution, the dry aldehyde carbohydrates are subjected to vigorous procedures involving long solution time, boiling or heating in water in the presence of borax or sodium bisulfite. These procedures can damage the aldehyde carbohydrate polymer. Bisulfite adducts of aldehyde starch are known as shown by U.S. Patent 2,880,236 to Mehltretter et al. Such adducts are disclosed as useful as sizing agents, adhesives and thickeners.

It has now been discovered that such bisulfite adducts may be produced simply by mixing the bisulfite compound with the aldehyde carbohydrate, in which the moisture content is less than 50%, at ambient temperature, letting the mixture stand until reaction has occurred, generally between 8 to 24 hours, and subsequently drying the resulting reaction products to about 10% moisture content. Thus a novel method of preparation of the bisulfite adduct of aldehyde carbohydrates has been discovered.

In general, the bisulfite adducts were employed as such. It has now been discovered, however, that utlimate value in the use of the aldehyde carbohydrate may be achieved by destroying the bisulfite after solution of the adducts. This is achieved by treatment of the dissolved bisulfite adduct of the aldehyde carbohydrate with sufficient oxidizing agents to destroy part or all of the bisulfite present by oxidation thereof to the bisulfite form. It has been discovered that such products in which the bisulfite has been so oxidized provides unexpected significant improvement in the various uses to which such aldehyde carbohydrates are normally employed.

It is therefore an object of this invention to provide a novel method of preparing aldehyde carbohydrate bisulfite adducts.

It is also an object of this invention to provide a novel means of employing such aldehyde carbohydrate bisulfite adducts.

It is also an object of this invention to provide aldehyde carbohydrate bisulfite adducts in which the bisulfite groups have been oxidized.

As indicated previously, this invention relates to a novel method of preparing the aldehyde carbohydrate bisulfite adducts. In general, the formation of such adducts takes place by the reaction of alkali metal bisulfite with aldehyde carbohydrates. Generally, one mole of bisulfite is employed for each aldehyde group present in the aldehyde carbohydrate. The aldehyde carbohydrates may be partially or completely oxidized products as discussed in the art. This novel method of preparation of the bisulfite adduct is conducted by merely mixing the alkali metal bisulfite with the aldehyde carbohydrate at ambient temperatures in which the aldehyde carbohydrate has a moisture content of less than about 75% and more than about 40%. The mixture is allowed to stand for a sufficient time to allow reaction to take place which generally occurs between 8 to 24 hours. The product is subsequently dried to a moisture content of about 10% (5 to 15%) to provide a dry aldehyde carbohydrate bisulfite adduct which is easily water soluble.

Much of the expected utility of aldehyde carbohydrates comes from the reaction of the aldehyde with functional groups and other material with which the aldehyde carbohydrate is being used, as with the OH groups in cellulosic paper and textiles and the amino groups in protein. The bisulfite adduct of the aldehyde carbohydrates seems to be a relatively stable compound and the bisulfite seems to effectively interfere with the reaction of the aldehyde group with other reactive groups in other materials, even under conditions, such as very dilute solutions, where this interference would not be expected to occur.

Accordingly, as indicated above, this invention relates to various means of destroying bisulfite in dissolved bisulfite adducts of aldehyde carbohydrates in order to insure proper functioning of the aldehyde carbohydrates in the various uses to which the aldehyde carbohydrates might be put. In general, this involves treatment of the dissolved bisulfite adduct of the aldehyde carbohydrate with an oxidizing agent sufficient to destroy part or all of the bisulfite present in the aldehyde carbohydrate solution by oxidation to the bisulfite form. The preferred oxidizing agent is hydrogen peroxide; however, other oxidizing agents either gaseous, liquid or solid oxidants such as air, iodic acid and the alkali metal and alkaline earth metal salts thereof such as sodium, potassium and calcium iodates may be employed. This group of oxidizing agents is intended as being illustrative and the invention is not to be limited thereto. Any bisulfite-destructive, oxidizing agent may be employed. The oxidant is employed in an amount sufficient to destroy the desired amount of bisulfite.

The present invention, therefore, has several advantages in that difficult and rigorous procedures for getting aldehyde carbohydrates into effective solution need not be used but the water soluble bisulfite form which is easily dissolved may be employed and any interference, however, from the bisulfite groups is eliminated by oxidation thereof.

A preferred class of aldehyde polysaccharides is the dialdehyde galactomannan gums (such as guar or locus bean gum). These modified gums are prepared in a number of ways, preferably by intimately mixing 1 part of gum with about 1–3 parts slightly acidic water containing from about 0.05 to 0.25 mole of periodic acid or its salts per mole of hexose unit. After the reaction is complete, the product is freed of excess $IO_3^-$ by washing. This modified gum may then be converted to the bisulfite adduct.

The dialdehyde guar gum bisulfite adducts of the present invention may be conveniently prepared by the following method.

160 g. (dry weight) of commercial guar gum was placed in a small Readco laboratory mixer and 300 cc. of slightly acid solution containing about 0.05 mole of periodate was added over an hour period. About 488 g. of product was obtained. This was dried to 215 g. in a small gas heated laboratory rotary drier. The dried product was suspended in about 850 cc. of water and collected in a basket centrifuge. The product was washed in the centrifuge with about 300 cc. of water. 830 cc. of washing containing 80% of the resulting $IO_3^-$ were obtained. The product was resuspended in about 1 liter of water and again collected in the centrifuge; 850 cc. of washing containing 10% of the resulting $IO_3^-$ were obtained; 430 g. of moist product were obtained. The moist product was well mixed with 18 g. of $NaHSO_3$ in a laboratory mixer. It was then dried in the small gas heated laboratory rotary drier. 200 g. of product containing 14% moisture was obtained.

The invention may be further illustrated by means of the following examples.

EXAMPLE I

The bisulfite adducts of 20% and 50% dialdehyde starch were prepared in 5% solution, based on starch content. Portions of these were mixed with small quantities of $H_2O_2$ until $I_2$ solution was not decolorized by the solution, which indicated that $SO_2$ was absent from the solution. Dialdehyde cellulose (40% dialdehyde) adduct was prepared in a similar manner in 5% solution. Dialdehyde locust bean gum 10% adduct was also prepared in a similar manner in 2.5% solution, based on weight of adduct. The $H_2O_2$ treatment made the pH of the solutions very acid, with pH near 2.0. Thus samples of the $H_2O_2$ treated solutions were in turn adjusted to a pH near 4.

The solutions were cast on paper in 3 mil films. Half of the films were allowed to dry. The other half were placed in close contact with duplicate sheets of the same paper and allowed to dry.

The paper with the cast film was wetted with distilled water, and the presence or absence of sizing noted. When the sheets were well wetted, the presence of wet strength was noted in the sized part of sheet by pulling the wet sheet apart with the fingers.

The papers glued together were torn apart to note if separation occurred at the adhesive bond, indicating poor adhesive characteristics, or beside the bond in the paper itself indicating the bond was stronger than the paper. This procedure was repeated after the sheet had been wetted 5–10 minutes in distilled water. Results are in the following Table I.

The bleached kraft was beaten to a Schopper-Riegler freeness near 700 in a Valley Laboratory beater. Gum solution was added to and mixed with samples of the beaten pulp. Handsheets were prepared on a Noble and Wood Handsheet Machine. Handsheets were made near pH 4.0, with 3 handsheets prepared at each additive level. Ten burst values were taken from each handsheet after it had soaked 15 minutes in distilled water at room temperature. Results are in the following Table II.

*Table II*

| Gum Solution | Wet burst, lbs./100 lbs. ream wt., (2.5% additive based on pulp solids) |
|---|---|
| Bisulfite adduct as is, pH 5.5 | 36 |
| Bisulfite adduct, $H_2O_2$ treated, pH 4.5 | 70 |

The results in the table show that wet strength obtained from dialdehyde locust bean gum bisulfite adduct is significantly better if the bisulfite in the gum solution is destroyed prior to use of the gum as a wet end additive.

The handsheets were prepared from a 0.025 solids pulp (in the handsheet mold) and the dialdehyde locust bean gum was present at 2.5%, based on pulp solids. There was no more than 0.125 g. bisulfite per 100 kg. of pulp suspension if the bisulfite were not destroyed in the gum adduct, yet significantly better results were obtained by destroying this small amount of bisulfite in the gum solution after the adduct had dissolved.

EXAMPLE III

10% oxidized dialdehyde guar gum bisulfite adduct (prepared essentially as previously described) was made into a 1% solution at pH 4.5, treated with various levels of hydrogen peroxide, and handsheets prepared employing the modified gum at a level of 2.5% based on dry pulp weight. Wet strength data were as follows:

*Table I*

| Sample of dialdehyde | $H_2O_2$ treated | pH | Tests in coated paper | | Tear tests on sheets glued together | |
|---|---|---|---|---|---|---|
| | | | Sized | Wet strength | Dry | Wet |
| Starch (20%)* | No | As is (near 2.0). | Yes | No | Beside bond | At bond. |
| Do* | Yes | As is | Yes | Some | do | Beside bond. |
| Do* | Yes | 4 | Yes | do | do | Do |
| Starch (50%)* | No | As is | Yes | None | do | At bond. |
| Do* | Yes | do | Yes | do | do | Do. |
| Do* | Yes | 4 | No | Some | Not bonded | Not bonded. |
| Locust bean (10%)* | No | As is | Yes | Good | At bond | At bond. |
| Do* | Yes | do | Yes | Very good | Beside bond | Beside bond. |
| Do* | Yes | 4 | Yes | do | do | Do. |
| Cellulose (40%)* | No | As is | Yes | None | do | Beside bond (weaker than below). |
| Do* | Yes | do | Yes | Some | do | Beside bond. |
| Do* | Yes | 4.0 | Yes | do | do | Do. |

*Figures are percent oxidation of carbohydrate.

The above table shows that when dialdehyde carbohydrate bisulfite adducts are applied as a size to paper that better wet strength results if the bisulfite is destroyed. It also shows that while either form functions as an adhesive on dry paper, only the oxidized products provide a wet strength adhesive.

EXAMPLE II

The bisulfite adduct prepared essentially as previously described of 10% dialdehyde locust bean gum was prepared in 1% solution in water. It had a pH of 5.5. Another similar sample of gum was prepared and treated with sufficient $H_2O_2$ to destroy the bisulfite. The pH was adjusted to pH 4.5 after the peroxide treatment.

The solution was used as wet end wet strength additives in bleached kraft handsheets.

| Cc. 30% $H_2O_2$ added per 500 ml. 1% modified gum bisulfite adduct | Wet burst, lbs./100 lbs. ream weight (2.5% modified gum based on pulp solids) |
|---|---|
| 0 | 25 |
| 0.25 | 27 |
| 0.50 | 28 |
| 0.75 | 49 |
| 1.0 | 51 |
| 2.0 | 48 |

EXAMPLE IV

In the same manner, a 1% solution of the bisulfite adduct of a 10% oxidized dialdehyde guar gum was prepared at pH 3.4, treated with 1 cc. of 30% hydrogen peroxide per 500 cc. of 1% solution of dialdehyde guar gum, and allowed to stand for 2 hours and 4 days respectively. Wet burst values (lbs./100 lbs. ream weight) developed when the treated solutions were used, at a level of 2.5% dialdehyde gum based on pulp solids, were 48 lbs. and 58 lbs. for the solutions held 2 hours and 4 days respectively. An untreated solution gave values of 24–27 lbs.

The invention is applicable to aldehyde carbohydrates of any degree of oxidation in forming the initial aldehyde carbohydrate with periodic acid or the salts thereof. In the formation of the adduct, the bisulfite added is generally added in the form of an aqueous solution although this is not necessary and the bisulfite may be added in the form of a solid. The adduct is added in an amount of from 0.1 to 5% by weight, generally in solution, based on the weight of pulp solids.

The embodiments of the invention in which an exclusive property or privilege is claimed are defined as follows:

1. A process of preparing bisulfite adducts of dialdehyde polysaccharides comprising intimately contacting a dialdehyde polysaccharide having a moisture content of more than about 40% and less than 75% by weight with a solid alkali metal bisulfite compound for a time sufficient for reaction and subsequently drying the adduct to a moisture content of about 10% by weight.

2. A process as defined in claim 1 in which said bisulfite compound is sodium bisulfite.

3. A process as defined in claim 1 in which said dialdehyde polysaccharide is selected from the group consisting of dialdehyde starch, dialdehyde cellulose and dialdehyde polygalactomannan gums.

4. A process of activating bisulfite adducts of dialdehyde polysaccharides comprising treating said bisulfite adduct of a dialdehyde polysaccharide with a bisulfite-destructive oxidizing agent.

5. A process as defined in claim 4 in which said oxidizing agent is hydrogen peroxide.

6. A process as defined in claim 4 in which said oxidizing agent is selected from the group consisting of iodic acid and the alkali metal and alkaline earth metal salts thereof.

7. A process as defined in claim 4 in which air is employed as the oxidizing agent.

8. A process as defined in claim 4 in which said dialdehyde polysaccharide is selected from the group consisting of dialdehyde starch, dialdehyde cellulose and dialdehyde polygalactomannan gums.

9. The composition consisting of the reaction product of a bisulfite adduct of a dialdehyde polysaccharide and a bisulfite-destructive oxidizing agent.

10. The reaction product defined in claim 9 in which said dialdehyde polysaccharide is selected from the group consisting of dialdehyde starch, dialdehyde cellulose and dialdehyde polygalactomannan gums.

References Cited by the Examiner

UNITED STATES PATENTS

| | | | |
|---|---|---|---|
| 2,767,167 | 10/1956 | Opie et al. | 260—209 |
| 2,894,945 | 7/1959 | Hofreiter et al. | 260—233.3 |
| 3,033,851 | 5/1962 | Schaefer et al. | 260—233.3 |
| 3,062,703 | 11/1962 | Hofreiter et al. | 162—175 |
| 3,067,088 | 12/1962 | Hofreiter et al. | 162—175 |
| 3,098,869 | 7/1963 | Borchert | 260—209 |

LEWIS GOTTS, *Primary Examiner.*

MORRIS O. WOLK, *Examiner.*